United States Patent Office 2,918,315
Patented Dec. 22, 1959

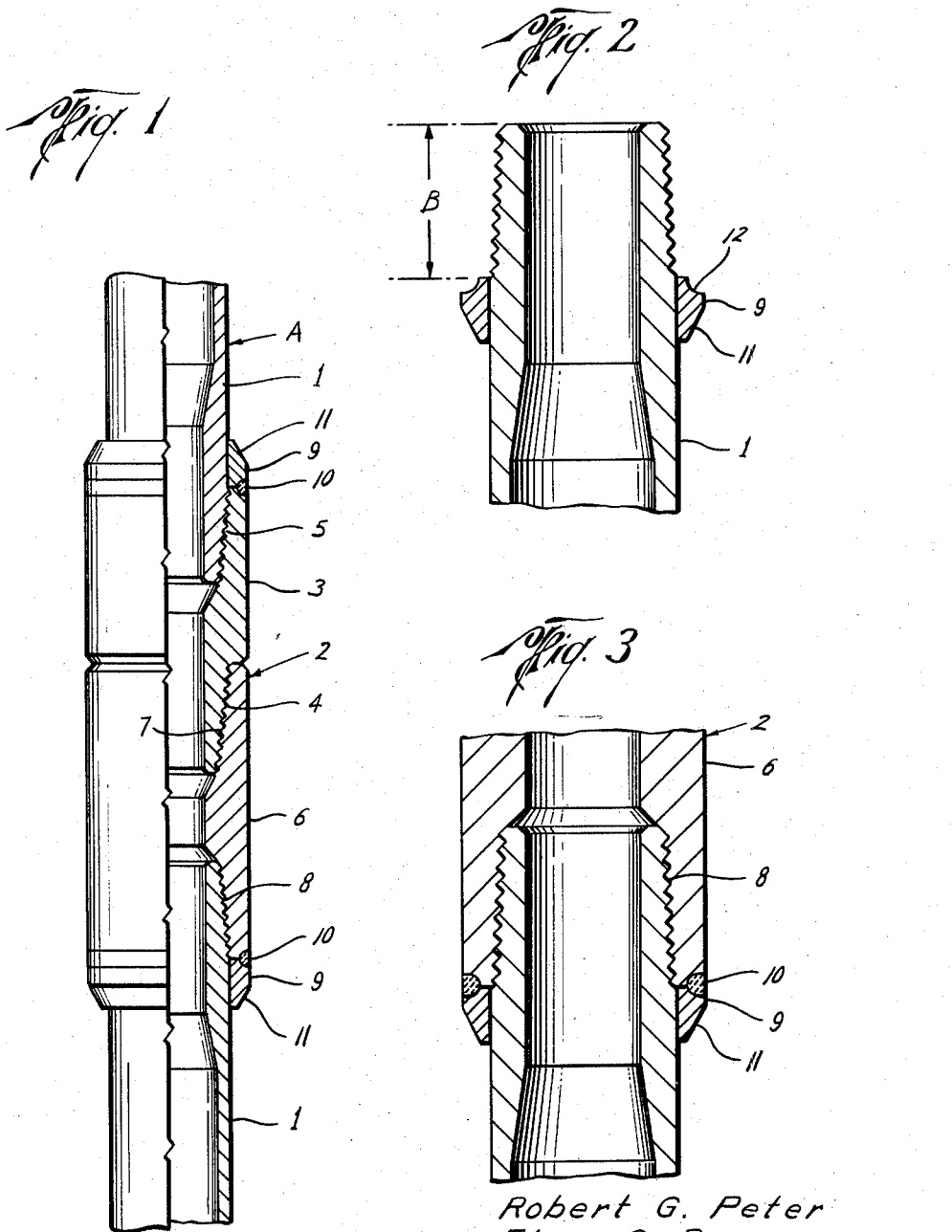

2,918,315

SHRINK RING TOOL JOINT

Robert G. Peter and Elvin G. Boice, Houston, Tex., assignors to Reed Roller Bit Company, Houston, Tex., a corporation of Texas Application October 10, 1956, Serial No. 615,178

3 Claims. (Cl. 285—286)

This invention relates generally to pipe couplings, and more particularly to tool joints for deep well drill stems.

In conventional deep well drilling, the well drill stem is comprised of a purality of pipe sections connected together by threaded couplings which are known as tool joints. The drill stem serves to raise or lower and drive a drill bit (not shown) connected to the lower end thereof, and conducts drilling fluid to the bottom of a bore hole to remove cuttings dislodged by the drilling operation.

In securing a threaded tool joint to a threaded end of a drill pipe section, it is desirable to provide a drilling fluid seal. It is also desirable that the last engaged thread on the pipe section be protected from strains induced therein when the tool joint is screwed onto the end of the pipe, and protected against fatigue and failure from strains induced therein from bending, torque and vibration when in use.

It is an object of this invention to provide a new and improved tool joint with a drilling fluid seal.

Another object is to provide a new and improved tool joint which will alleviate failures in the pipe in the area of the last engaged thread.

Another object is to provide a tool joint which may be used with standard threaded oil field pipe.

Another object is to provide a tool joint wherein the mating pipe outside diameter needs no special machining, and a joint which may usually be used on threaded pipe which is in the "as received" condition.

Another object is to provide a new and improved tool joint which may be used with pipe that is somewhat eccentric or "egg-shaped" with respect to the axis of the threaded pipe end, and still provide an adequate drilling fluid seal.

Another object is to provide a new and improved "shrink grip" tool joint wherein only a portion of the tool joint is heated prior to assembly on a pipe end.

Another object is to provide a tool joint which may be installed or removed in the field.

Other objects will appear from the following description and accompanying drawings.

Fig. 1 is a vertical elevation view, partly in section, of a tool joint.

Fig. 2 is an enlarged sectional view of a pipe end with a ring mounted thereon.

Fig. 3 is an enlarged sectional view showing an assembled pipe end and tool joint member.

Referring to Fig. 1, a drill stem is shown generally at A having pipe sections 1 which are coupled together by the tool joint 2 of the invention. The tool joint comprises a pin member 3 having an externally threaded pin 4. The pipe 1 is threaded into the pipe end of the member 3 which is provided with threads 5 to interengage with the threaded end of the pipe 1.

A box tool joint member 6 has an internal tapered threaded box 7 for interengagement with the threaded pin 4 of the pin member 3. The box tool joint member 6 is also provided with internal threads 8 for engaging the threaded end of the pipe section 1.

Rings 9 encircle the pipe sections 1 and are located adjacent the pipe ends of the tool joint members 3 and 6 respectively. The rings 9 are joined respectively to the pipe ends of the tool joint members 3 and 6 by means of a weld 10. The tool joint members 3 and 6 fasten to the respective pipe sections 1 in an identical manner, so that a description of one will also describe the other.

Referring to Fig. 2 the pipe section 1 is shown with the ring 9 mounted thereon. The ring 9 may have a conical shoulder 11 for engagement with an elevator (not shown) to raise and lower the drill stem. The ring 9 may be contoured as at 12 for the later accommodation of weld metal.

In Fig. 3 the pipe section 1 is shown with the ring 9 in place and with the tool joint member 6 screwed upon the threaded end of the pipe as at 8. The ring 9 is in position adjacent the pipe end of the member 6, and the contour 12 of the ring 9 together with a contour 13 of the member 6 form an annular groove which is supplied with the weld metal 10.

To assemble the tool joint, the ring 9 is heated in a furnace or by a torch, or any other suitable means, and placed to a predetermined distance B on the pipe section 1. The tool joint member 6 is then screwed upon the threaded end of the pipe section 1 to a predetermined degree of torque so that the pipe end of the member 6 is adjacent to the ring 9, as shown in Fig. 3. An annular weld 10 is then supplied to fasten the ring 9 to the member 6 whereupon the assembly is allowed to cool thereby shrinking the ring 9 onto the pipe section 1.

We have found that the ring 9 may be heated to a temperature of approximately 750° F. up to 2200° F. to accommodate a nominal .010 to .012 inch initial interference between the outside diameter of the pipe 1 and the inside diameter of the ring 9; in addition, the outside diameter of the pipe 1 may be approximately up to .035 inch "egg-shaped" or eccentric with respect to the threaded axis of the pipe section 1 notwithstanding which the heated ring 9 will accommodate itself to the pipe exterior to provide a satisfactory drilling fluid seal and thread protection, after being welded to the tool joint member 6, and being allowed to cool.

Since the ring 9 is initially separate from the tool joint member 6, it will, when heated and placed on the pipe 1, conform independently to the outside configuration of the said pipe, and will match satisfactorily, for welding, with the pipe and of the tool joint member 6, after the said member is screwed on the pipe 1, irrespective of a reasonable amount of eccentricity between the tool joint member 6 and the ring 9. Thus the tool joint member 6 may be machined with correspondingly less accuracy, and the outside diameter of the pipe 1 needs no special machining to accommodate the shrink ring 9. The pipe 1 in the area where the ring 9 is positioned may usually be used in the as-received condition, or, if desired, this area may be cleaned up by knurling or in any other suitable manner to accommodate the shrink ring 9.

To replace the tool joint member, the weld 10 may be machined out, and the member 6 unscrewed from the pipe section 1, whereupon a new member 6 may be screwed on the pipe 1, and welded to the ring 9, as previously described. Or, if necessary or desired, the ring 9 and weld 10 may be cut with an oxy-acetylene cutting torch, or in any other suitable manner, whereupon the member 6 may be unscrewed from the pipe 1, and a new ring 9 and member 6 supplied to the pipe 1, in the manner previously described.

This invention is not limited to the embodiment shown. Other embodiments within the scope of the following claims will occur to those skilled in the art.

We claim:

1. A tool joint comprising a pin member and a box member adapted to interengage, said members having pipe-attachment ends consisting of threaded sockets, pipe sections having threaded ends and threadedly attached to the pipe-attachment ends of the said members, a ring shrunk on each of the said pipe sections adjacent their threaded ends, said rings abutting said pipe-attachment ends of the said members, each said ring being contoured to form with its respective pipe-attachment end an annular groove extending radially inwardly towards said pipe section the bottom wall portion thereof being spaced from said pipe section, said joint being welded at said groove, said weld penetrating no further than the bottom of said groove whereby said pipe-section in the region of said groove is protected from the heat of the welding.

2. A tool joint member comprising a threaded joint end and a threaded socket end, a pipe section threadedly engaged within the said threaded socket end of the said member, a ring having substantially the same wall thickness as said socket end shrunk on the said pipe section adjacent the threaded end of said pipe section and abutting the socket end of the said joint member, the said ring being welded to the said socket end of the said joint member, the weld extending radially inwardly toward said pipe section no more than substantially halfway of the thickness of the wall section of the socket or ring whereby said pipe section in the region of said weld is protected from the heat of the welding.

3. A tool joint member comprising a threaded joint end and a threaded socket end, a pipe section threadedly engaged within the said threaded socket end of the said member, a ring having substantially the same wall thickness as said socket end shrunk on the said pipe section adjacent to the threaded end of said pipe section and mating with the socket end of the said joint member, the said ring being welded to the said socket end of the said joint member, the weld extending radially inwardly toward said pipe section no more than substantially halfway of the thickness of the wall section of the socket or ring whereby said pipe section in the region of said weld is protected from the heat of the welding.

References Cited in the file of this patent

UNITED STATES PATENTS

| | | |
|---|---|---|
| 745,842 | Hock | Dec. 1, 1903 |
| 1,859,809 | Timbs | May 24, 1932 |
| 2,121,035 | Hollister et al. | June 21, 1938 |
| 2,535,320 | Richardson | Dec. 26, 1950 |
| 2,539,057 | Brown | Jan. 23, 1951 |
| 2,653,211 | Andrus | Sept. 22, 1953 |
| 2,711,912 | Boice | June 28, 1955 |
| 2,792,241 | Bondley et al. | May 14, 1957 |